UNITED STATES PATENT OFFICE.

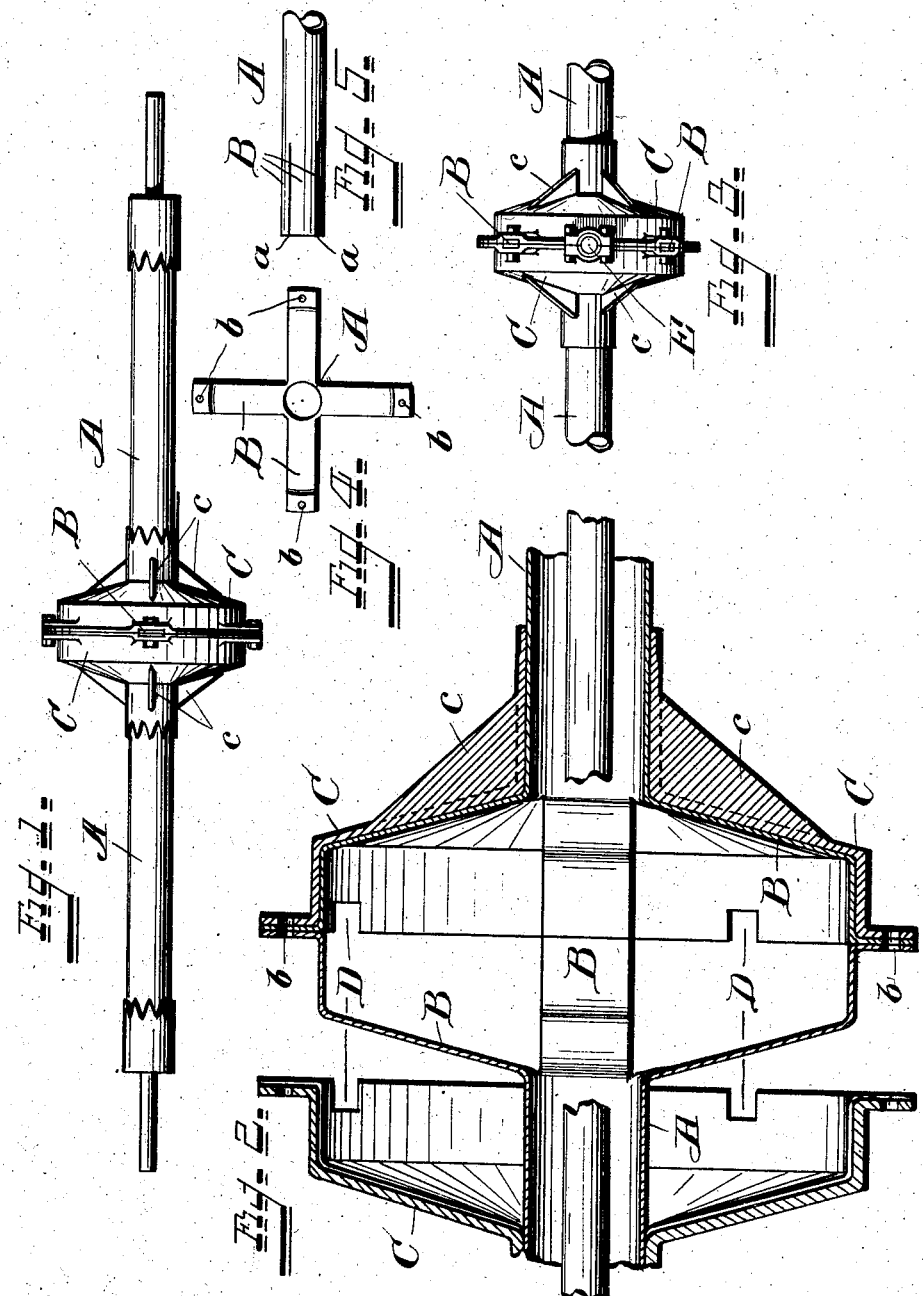

EMMET P. GRAY, OF CINCINNATI, OHIO, ASSIGNOR TO GRAY MANUFACTURING COMPANY OF DETROIT, OF DETROIT, MICHIGAN, A CORPORATION OF MICHIGAN.

DIFFERENTIAL-GEAR CASING.

No. 823,524.      Specification of Letters Patent.      Patented June 19, 1906.

Application filed January 2, 1904. Renewed February 19, 1906. Serial No. 301,913.

*To all whom it may concern:*

Be it known that I, EMMET P. GRAY, a citizen of the United States, residing at Cincinnati, in the county of Hamilton and State of Ohio, have invented certain new and useful Improvements in Differential-Gear Casings, of which the following is a full, clear, and exact description, reference being had to the accompanying drawings, forming part of this specification.

My invention relates to casings or housings for differential gears, and is particularly adapted for use in automobile construction where divided shafts are used and it is essential that the same be kept at all times in perfect alinement; and it has for its object the provision of a casing which is simple in construction, efficient in action, and which renders the interior of the casing readily accessible without disturbing the adjustment of the parts or requiring the removal of the casing from the machine, as is necessary with the casings now employed.

The novelty of my invention will be hereinafter more fully set forth, and specifically pointed out in the claims.

In the accompanying drawings, Figure 1 is a side elevation of a casing embodying my invention and shown applied to a rear axle for an automobile. Fig. 2 is a broken sectional elevation of the casing, showing the same partly opened and on an enlarged scale. Fig. 3 is a broken side elevation similar to Fig. 1, showing the casing adapted for a bevel-gear drive. Fig. 4 is an end elevation of the tube forming one-half of the casing. Fig. 5 is a side view of the tube, the same being cut ready for spreading to the position shown in Fig. 4.

The same letters of reference are used to indicate identical parts in all the figures.

Heretofore in differential-gear-case construction the case has been made of two cupped disks, which have been either screwed together or flanged and bolted together at their adjoining faces and which have been provided with central threaded apertures into which tubes have been screwed and sometimes brazed. These tubes have their axes coincident, and in them is journaled the shaft carrying the rear wheels. This shaft is usually split or divided at the center of the gear-casing, and the differential gear embraces and drives these two adjacent ends of the shaft. With the above-described construction there has always been more or less trouble arising from the difficulty in getting at the inclosed gearing and also from the fact that the tubes frequently bend or break where they are joined to the two halves of the casing, and in repairing the differential gear and sometimes even to adjust the bearings of the shaft it is nearly always necessary to remove the whole casing and its inclosed gearing and shafts entirely from the machine, thus entailing a great deal of labor and disturbing of adjustments. Under my construction this is entirely obviated, and I will now proceed to describe it in detail.

I provide tubes A, which may be seamless tubing, welded tubing, or tubing formed of sheet metal rolled and brazed. These tubes are split, as at *a*, Fig. 5, the length of these splits being determined by the diameter of the casing, and while I prefer to split the tube into four parts this number may be varied to suit any requirements. These tubes after being split are inserted in any suitable press or former and the split portions upset or spread to form a frame, as shown in Fig. 4. The outer ends of the arms B forming this frame are provided with bolt-holes *b* for bolting the two adjacent frames together. Where heavy tubing is used and where it is not desired to entirely inclose the differential gearing, the forming and joining of these two frames will be all that is necessary to provide a very efficient casing and one which is perfectly rigid and without screwed or brazed joints, besides being exceedingly cheap to construct.

Where it is desired to use lighter tubing, the frames may be reinforced by similar frames made of shorter pieces of tubing of an interior diameter equal to the exterior diameter of the main tubing cut and stamped on lines to coincide with the lines of the frame on the main tubing and brazed or suitably secured to the frame on the main tubing to reinforce said frame, as will be readily understood.

Where it is desired to entirely inclose the differential gearing for the purpose of protecting the same, cupped stampings or castings C may be slipped over the frames and bolted together, either with the same bolts that hold the frame or in any other suitable manner, and these stampings or castings C may have reinforcing-ribs c, as shown in section in Fig. 2, on the right-hand side of the figure or may be made plane, as shown on the left-hand side of said figure.

The apertures D in Fig. 2 indicate openings for the admission of the chain where a chain-drive is used. Where a bevel-gear drive is used, the cups C may each carry half of a journal E, as clearly shown in Fig. 3. This journal E is for the driving-shaft, which carries the driving bevel-gear, which in turn meshes with any suitable bevel-gear mounted upon the differential within the casing, as will be readily understood.

As clearly shown in Fig. 2, where the cups C are employed to inclose the gearing should anything require attention within the casing, such as the differential gear or the axle-bearing, it is only necessary to unbolt the cups C and slip them back away from the frames B, when the whole interior of the casing will be exposed without requiring the removal of the casing and its inclosed gearing and shafts from the machine and without requiring the disturbing of any of the adjustments of the bearings or any other parts of the machine.

While this form of construction is particularly adapted for automobile work and more particularly for rear-axle construction, still it may be used for other purposes, such as in some makes of heavy touring-cars, where the rear axle is not revolved and where the rear wheels revolve on the ends of the rear axle and are separately driven from a counter-shaft in the body of the vehicle, on which counter-shaft it is necessary to have a differential gear. This construction will also be found advantageous in other classes of machinery where it is desired to maintain the adjacent ends of shafts in alinement, as will be readily understood

Having thus fully described my invention, I claim—

1. In gear-casing construction and in combination, tubes adapted to inclose shafts, said tubes having one end split, said split portions being spread to form frames embracing the adjacent ends of said shafts, and means for securing said frames together to maintain said tubes in proper alinement, substantially as described.

2. In gear-casing construction and in combination, tubes adapted to inclose shafts, said tubes having one end split, said split portions being spread to form frames embracing the adjacent ends of said shafts, reinforcing-frames secured to said first-named frames, and means for securing said frames together to maintain said tubes in proper alinement, substantially as described.

3. In gear-casing construction and in combination, tubes adapted to inclose shafts, said tubes having one end split, said split portions being spread to form frames embracing the adjacent ends of said shafts, housings adapted to slip over and inclose said frames and provided with an aperture for the transmission of power therethrough, and means for securing said frames and housings together to maintain said tubes in proper alinement, substantially as described.

4. A gear-casing construction comprising alined tubular portions and an intermediate construction formed from said tubular portions by splitting and expanding the same.

5. A gear-casing comprising alined tubular portions having their adjacent ends split and spread to form frames, and means to secure said frames together.

EMMET P. GRAY.

Witnesses:
 EDWARD PECK,
 EDWARD SUSSDORF.